United States Patent [19]
Wulff

[11] Patent Number: 4,777,759
[45] Date of Patent: Oct. 18, 1988

[54] ARTIFICIAL FISHING FLY

[76] Inventor: Lee Wulff, Beaverkill Rd., Lew Beach, N.Y. 12753

[21] Appl. No.: 82,136

[22] Filed: Aug. 6, 1987

[51] Int. Cl.$^4$ .............................................. A01K 83/00
[52] U.S. Cl. .................... 43/42.25; 43/42.28; 43/42.43
[58] Field of Search ................ 43/42.25, 42.27, 42.28, 43/42.43

[56] References Cited

U.S. PATENT DOCUMENTS

| | | | |
|---|---|---|---|
| 2,033,530 | 3/1936 | Meinecke | 43/42.25 |
| 2,575,797 | 11/1951 | Corsi | 43/42.43 X |
| 3,191,336 | 6/1965 | Cordell, Jr. | 43/42.28 X |
| 3,750,322 | 8/1973 | Putnam | 43/42.25 |

FOREIGN PATENT DOCUMENTS

| | | | |
|---|---|---|---|
| 379343 | 8/1932 | United Kingdom | 43/42.25 |
| 438819 | 11/1935 | United Kingdom | 43/42.27 |

Primary Examiner—Nicholas P. Godici
Assistant Examiner—Carmine Cuda
Attorney, Agent, or Firm—Charles R. Fay

[57] ABSTRACT

An artificial fishing fly having a body on the shank of the hook, there being a headed post rising from the body, to which post a parachute is tied in the form of a hackle feather wound on the post.

14 Claims, 1 Drawing Sheet

ARTIFICIAL FISHING FLY

BACKGROUND OF THE INVENTION

This invention relates generally to an artificial fishing fly referred to as a Parachute fly. This fly is generally fished dry and is characterized by a hackle wholly above the hook shank, i.e., opposite the hook, this hackle being wound and tied circularly with its fibers extending in a plane in all directions. Other, more conventional dressing may be added, but the parachute fly imitates better, floats better on the water surface, and is more stable. Some fly casters are of the opinion that it casts better and comes to settle on the water in a more life-like manner, and floats on the water surface film, rather than above the surface, as do more conventional types of dry flies.

However, the parachute fly is more difficult to tie properly, and this invention provides for easier tieing, while making the parachute better and more uniform from fly to fly. It is important that the hackle should be spread uniformly in a circle and lie in a fixed plane neatly.

SUMMARY OF THE DISCLOSURE

Almost any conventional dry fly hook may be used to make the fly of this invention, short or long shank, eye up or down, a conventional bonefish fly hook, etc. A plastic body is applied to the shank, and usually this body is tapered to imitate a fly body, especially being reduced in thickness as the body extends toward the bend of the hook. The plastic body has a protuberance on it adjacent the eye of the hook, this protuberance extending upwardly, assuming the hook is down, under the body. That is, the protuberance and the hook extend oppositely from the shank of the hook, and clearly are longitudinally spaced. The protuberance may be referred to as a post or a stub and its purpose is to aid in correctly tieing the hackle to the fly body in a circular form, coiled about the protuberance. It is preferred that the protuberance, or post, have an enlargement or head terminating it, this head additionally aiding in tieing on the hackle. The word "tieing" the hackle also includes adhesively attaching it as well as by the use of thread, or embedding in the plastic of the body. Simply by coiling the hackle about the post, the fibers of the hackle, e.g. rooster neck feather, are spread out in circular form in a plane over the eye and body adjacent thereto, this plane being at an angle, usually a right angle, to the plane of the bend of the hook.

PREFERRED EMBODIMENT OF THE INVENTION

Figure 1:
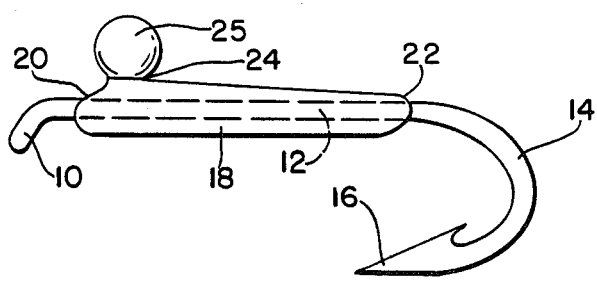
FIG. 1 is a view in elevation of a conventional long shank turned down eye hook having a novel body applied to it.

This invention may be applied to many different hooks but is illustrated by a long shank "streamer" hook having an eye 10, a shank 12, and a hook 14 with point 16. Such a hook is conventional and is used to make the well-known streamer fly, among others, and is obtainable almost anywhere such goods are sold.

A plastic or similar long tapered body 18 is applied to the shank 12, and this body preferably substantially covers or encases the shank, being tapered at both ends as at 20 near the eye and at 22 near the bend of hook 14, to more closely conform to a natural body. These tapered end portions of body 18 are not necessarily similar, and front tapered portion 20 may well be more blunt than rear tapered portion 22.

A protuberance, post or "stub" 24 integral with body 18 extends radially upwardly from the body adjacent the eye 10 about in the area of the front taper 20 of the body, if such taper is present, but in any event preferably near the eye. This protuberance is very short and small, and preferably has an enlargement or head 25 terminating it at its free end.

Figure 2:
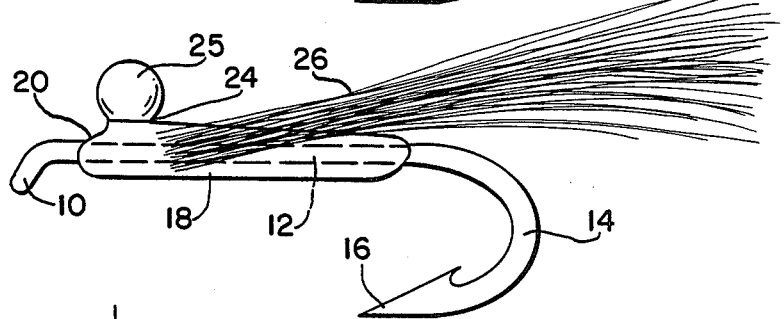
FIG. 2 is a like figure having had a 'wing' applied to the body.
Figure 3:
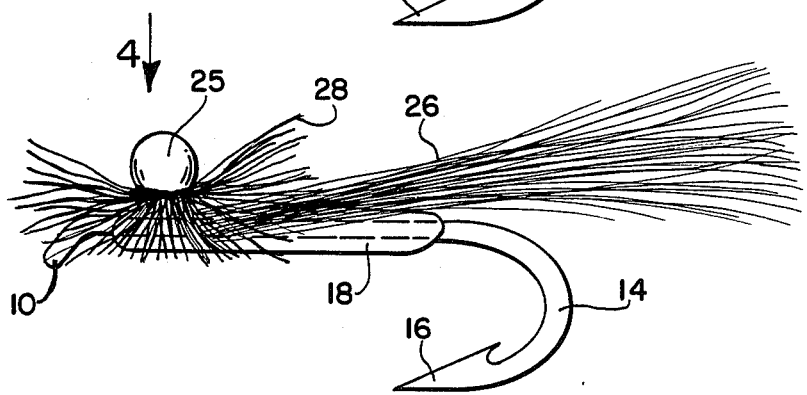
FIG. 3 is the same as FIG. 2 with the addition of the "parachute" hackle.

A wing or streamer material 26 may be tied to the protuberance, as shown in FIG. 2. This is usually animal hair or feathers and can be wound on by thread extending about the protuberance or it can be adhesively secured at that area, being otherwise free of the fly body in the usual manner. What is not usual is that there is preferably no thread winding about the body, that is, the plastic body, which may be flattened at its underside, i.e. the side opposite the protuberance 24.

Now the stem of the hackle 28, usually a rooster neck feather, can be attached to the protuberance under the head 25. The feather is applied by its butt end to the post, wound around it several times, and then tied down to it by thread and adhesive, or by adhesive alone. By this action, a circular, flat, co-planar "parachute" 28 is provided, all at the one side of the hook opposite the bend, and at the opposite end of the fly. In some cases, the hackle can be embedded in the post, if the plastic material is of the right composition for this procedure.

Figure 6:
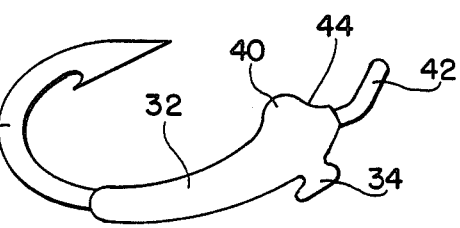
FIG. 6 illustrates a hook and body for a bonefish fly, according to the invention.
Figure 7:
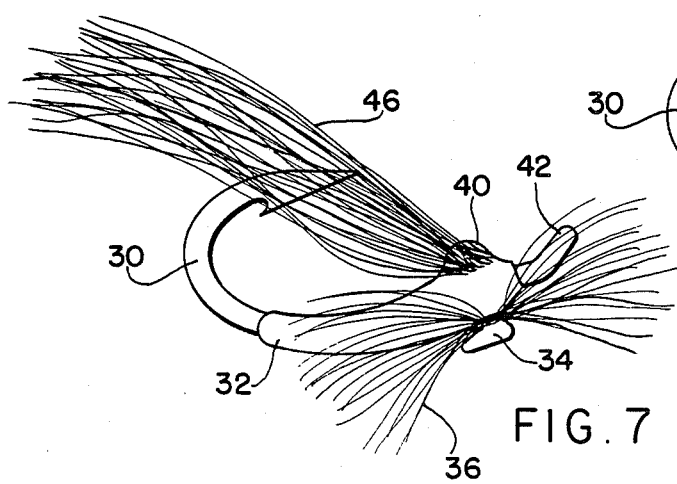
FIG. 7 illustrates a dressed bonefish fly.

Some variations are possible and desirable, as in the bonefish fly shown in FIGS. 6 and 7, wherein the hook 30 is of conventional design and the plastic body 32 is made to conform. The protuberance or post 34 is similar to that at 24, 25, and so is the feather parachute 36, but in the case of the bonefish fly, there preferably is a stub 40 at the side of the body opposite the post and near the eye 42. This stub has a surface 44 sloping away from the eye, as shown in FIG. 6 to form a directive base for a "wing" of animal hair, feather, or the like as at 46.

The new fly has a horizontal hackle fiber spread which will lie flat on the surface of the water to give better floatation and to give a better imitation of the legs of the insect, except in a weighted fly, as for bonefish.

Figure 5:
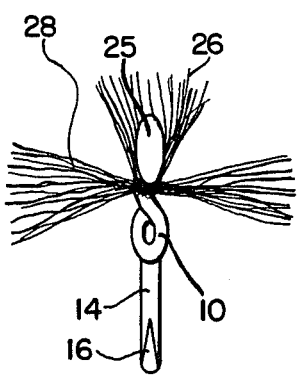
FIG. 5 is an end view of the artificial fly of FIGS. 3 and 4, looking in the direction of arrow 5 in FIG. 3, and showing how the fly floats.
Figure 4:
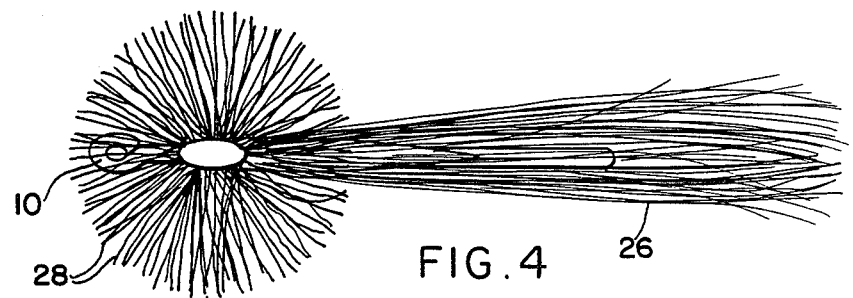
FIG. 4 is a plan view of FIG. 3 looking in the direction of arrow 4.

The present fly has animal fibers, hair or feather fibers extending back above the body behind the post to which the hackle is wound so that it floats in the surface film instead of rising up above it which would be unnatural for an emerging insect or a flying insect at rest on the water with its wings lying tight to its back like a stone fly, see FIG. 5. Most dry flies sit up in cocked condition.

The fly floats better with less bulk than when the hackle feather is wrapped around the shank of the hook conventionally, which is an unnatural position for insect leg imitations. It floats on the surface tension of flat fibers rather than on the points of a greater number of fibers more or less perpendicular to the shank of the hook and to the surface of the water as conventional dry flies do.

The fly can also be skimmed across the surface or pulled under the surface to give an excellent imitation of a darter-type minnow, a minnow which has broad pectoral fins just behind its head. This fly is particularly effective in catching trout and Atlantic salmon.

The novel fly could be referred to as "Emerger" or Surface Stone Fly, but basically it is a parachute fly, made on a conventional hook.

I claim:

1. An artificial fishing fly comprising a conventional hook having a shank, an eye and a point at opposite ends of the shank, a one piece plastic body secured to and surrounding the shank, having an integral protuberance on the body defining a head and a neck, and at least one hackle secured to the neck of the protuberance.

2. The fly of claim 1 wherein the protuberance is in the form of a short post, and a head on the post away from the shank.

3. The fly of claim 1 including fibers attached to the protuberance and extending backwards from the protuberance over the shank in a direction from eye to hook.

4. The fly of claim 1 wherein the hackle is secured to the protuberance generally in a plane about the protuberance to one side only of the body.

5. The fly of claim 4 wherein the plane of the hackle is on the side of the body opposite the hook and at a right angle to the plane of the bend of the hook, thereby forming a "parachute" fly.

6. The fly of claim 5 wherein the hackle is generally circular in form.

7. The fly of claim 6 wherein the hackle is a feather.

8. An artificial fishing fly comprising a hook having a shank, an eye at one end of the shank and a reversely bent hook at the other end of the shank,
   a one piece body secured to and surrounding the shaft, having an integral protuberance extending normal to the shank adjacent the eye and opposite the extent of the hook and its bend,
   said protuberance having an enlarged head on it terminating the same, and a hackle tied to the protuberance under the head thereof and spread out in a plane normal to the plane of the bend of the hook.

9. The fly of claim 8 including fibers tied to the protuberance and extending rearwardly along the shank.

10. The fly of claim 8 including fibers attached to the body of the fly at the side opposite the protuberance, said fibers extending generally rearwardly toward the hook.

11. An artificial fishing fly comprising a conventional hook having a shank, an eye at one end of the shank and a hook at the other end of the shank,
    a separate, one piece body of a different material formed on the shank, having an integral post on the body adjacent the eye, said post extending upwards opposite the hook, a head on the post, a hackle tied to the post under the head, said hackle being spread in a circle about the post, wholly to one side of the shank and opposite the point, the hackle being in a plane at right angles to a plane including the hook shank and point.

12. The fly of claim 11 including a bump on the body adjacent the eye and opposite the post, the bump being under neath the fly body, and fibers secured to the bump and extending rearwardly toward the hook.

13. A body for an artificial fishing fly comprising a hook including a shank, an eye at one end thereof and a bend and point comprising a hook at the other end of the shank,
    a molded plastic tapered unitary fly body on the shank,
    a post forming an integral part of the fly body, said post extending out from the fly body, said post extending out from the shank at a general right angle thereto opposite the hook,
    said post forming a neck to which to secure dressing to the body all at one side only of the body, at the upper side thereof.

14. The body of claim 13 including a bump integral with the body, said bump extending from the body at the same side as the hook, and forming a base for securement of dressing to the body at the underside thereof.

* * * * *